United States Patent
Osaki et al.

(10) Patent No.: US 9,663,602 B2
(45) Date of Patent: May 30, 2017

(54) COMPOSITION AND METHODS USEFUL FOR MANUFACTURING AN OPTICAL COMPONENT

(71) Applicant: TOYO GOSEI CO., LTD., Ichikawa-shi, Chiba (JP)

(72) Inventors: Takeshi Osaki, Ichikawa (JP); Kana Naruse, Ichikawa (JP); Takashi Miyazawa, Ichikawa (JP)

(73) Assignee: TOYO GOSEI CO., LTD., Ichikawa-shi, Chiba (JP)

( * ) Notice: Subject to any disclaimer, the term of this patent is extended or adjusted under 35 U.S.C. 154(b) by 0 days.

(21) Appl. No.: 14/675,047

(22) Filed: Mar. 31, 2015

(65) Prior Publication Data
US 2015/0274871 A1    Oct. 1, 2015

Related U.S. Application Data

(60) Provisional application No. 61/973,066, filed on Mar. 31, 2014.

(51) Int. Cl.
| | | |
|---|---|---|
| H01L 51/52 | (2006.01) | |
| C08L 43/04 | (2006.01) | |
| C08F 220/28 | (2006.01) | |
| C09D 4/00 | (2006.01) | |

(52) U.S. Cl.
CPC ...... *C08F 220/28* (2013.01); *C08F 2220/281* (2013.01); *C09D 4/00* (2013.01)

(58) Field of Classification Search
None
See application file for complete search history.

(56) References Cited

U.S. PATENT DOCUMENTS

| | | | | |
|---|---|---|---|---|
| 5,180,757 A | * | 1/1993 | Lucey | C08F 290/08 522/76 |
| 5,800,952 A | * | 9/1998 | Urano | G03F 7/027 430/20 |

(Continued)

FOREIGN PATENT DOCUMENTS

WO    2015052914    4/2015

OTHER PUBLICATIONS

U.S. Appl. No. 14/547,097 with common inventors, filed Nov. 18, 2014.

(Continued)

*Primary Examiner* — Vu A Nguyen
(74) *Attorney, Agent, or Firm* — TraskBritt P.C.

(57) ABSTRACT

A composition suitable for manufacturing components and devices (e.g., optical or electronic components, films, and devices) is disclosed. Such compositions may comprise a first compound having a first polymerizable group, a second polymerizable group, and a third polymerizable group. The first compound preferably has no aromatic group, and the second compound is preferably able to generate a radical by cleavage of a bond of the second compound. The first polymerizable group, the second polymerizable group and the third polymerizable group may be identical substituents. Further, the first polymerizable group may be connected to a first chain connected to a first atom; the second polymerizable group may be connected to a second chain connected to the first atom; and the third polymerizable group may be connected to a third chain connected to the first atom.

16 Claims, 4 Drawing Sheets

(56) References Cited

U.S. PATENT DOCUMENTS

| | | | |
|---|---|---|---|
| 6,171,675 B1 * | 1/2001 | Iida | C08G 75/045 |
| | | | 428/64.4 |
| 9,240,565 B2 * | 1/2016 | Osaki | H01L 51/5237 |
| 9,366,782 B2 | 6/2016 | Osaki et al. | |
| 2003/0166814 A1 | 9/2003 | Sparrowe et al. | |
| 2004/0059013 A1 * | 3/2004 | Tanabe | C08F 283/006 |
| | | | 522/90 |
| 2014/0306375 A1 | 10/2014 | Wada et al. | |
| 2014/0309393 A1 | 10/2014 | Osaki et al. | |
| 2014/0335304 A1 | 11/2014 | Osaki | |
| 2014/0361275 A1 | 12/2014 | Osaki et al. | |
| 2015/0060728 A1 | 3/2015 | Enomoto et al. | |
| 2015/0141687 A1 | 5/2015 | Miyazawa | |
| 2015/0368453 A1 | 12/2015 | Wada et al. | |
| 2016/0017074 A1 | 1/2016 | Wada et al. | |
| 2016/0145274 A1 | 5/2016 | Miyazawa | |
| 2016/0159953 A1 | 6/2016 | Enomoto et al. | |
| 2016/0208127 A1 | 7/2016 | Wada et al. | |
| 2016/0215075 A1 | 7/2016 | Miyazawa | |

OTHER PUBLICATIONS

U.S. Appl. No. 15/027,855 with common inventors, filed Apr. 7, 2016.

U.S. Appl. No. 15/109,620 with common inventors, filed Jul. 1, 2016.

U.S. Appl. No. 15/116,791 with common inventors, filed Aug. 4, 2016.

* cited by examiner

COMPOSITION AND METHODS USEFUL FOR MANUFACTURING AN OPTICAL COMPONENT

CROSS-REFERENCE TO RELATED APPLICATION

This application claims the benefit under 35 U.S.C. §119(e) of U.S. Provisional Patent Application Ser. No. 61/973,066, filed Mar. 31, 2014, the contents of which is hereby incorporated herein in its entirety by this reference.

TECHNICAL FIELD

Several aspects of this disclosure relate to chemistry generally, and more particularly to a composition suitable for manufacturing optical or electronic components and devices.

BACKGROUND

Resins having excellent characteristics such as resistance to heat have been desired. Such resins can be suitable for optical or electronic components of devices because such resin can show suppression of deformation or dimensional change by heat generated during operation of device.

Optical materials for radically curable compositions suitable for cast molding are disclosed in JP 2004-2702A (laid-open disclosure date: Jan. 8, 2004), the contents of which are incorporated herein by this reference.

BRIEF SUMMARY

Described is a composition that includes a first compound that has a first polymerizable group, a second polymerizable group, and a third polymerizable group.

With regard to such a composition, it is preferred that the first compound have no aromatic group. Such a first compound can contribute to enhance the optical transmittance of a cured film or resin formed from such a composition because such first compound does not have a strong absorption band in the ultraviolet-visible region.

With regard to the composition, it is preferred that the composition further include a second compound that is capable of generating a chemical species. Typical examples of such chemical species are a radical, an acid, and a base. Such radical species can be generated by cleavage of a bond of the second compound.

With regard to such composition, it is preferred that the first polymerizable group, the second polymerizable group and the third polymerizable group are an identical substituent.

With regard to such composition, it is preferred that the first polymerizable group is connected to a first chain connected to a first atom; the second polymerizable group is connected to a second chain connected to the first atom; and the third polymerizable group is connected to a third chain connected to the first atom.

With regard to such composition, it is preferred that each of the first chain, the second chain and the third chain is a methylene group.

With regard to such composition, it is preferred that each of the first polymerizable group, the second polymerizable group and the third polymerizable group is any one of an acryloyl group and a methacryloyl group.

With regard to such composition, it is preferred that the first compound further has a fourth polymerizable group.

With regard to such composition, it is preferred that the fourth polymerizable group is connected to a fourth chain connected to the first atom.

With regard to such composition, it is preferred that such composition further includes a second compound that has a fifth polymerizable group and a sixth polymerizable group.

With regard to such composition, it is preferred that the second compound has no polymerizable group other than the fifth polymerizable group and the sixth polymerizable group.

With regard to such composition, it is preferred that the fifth polymerizable group is connected to a fifth chain connected to a second atom and the sixth polymerizable group is connected to a sixth chain connected to the second atom.

With regard to such composition, it is preferred that the fifth chain and the sixth chain are an identical substituent.

With regard to such composition, it is preferred that the second compound has a cyclic moiety. It is more preferable that the second compound has an alicyclic moiety.

With regard to such composition, it is preferred that such composition further includes a third compound.

With regard to such composition, it is preferred that the third compound is a silane coupling agent.

With regard to such composition, it is preferred that such composition further includes a fourth compound that is capable of enhancing adhesiveness of a resin or cured film formed of such composition to a substrate on which the resin or the cured film is formed.

With regard to such composition, it is preferred that the fourth compound has at least one hydroxy group bonded to a phosphorus atom.

With regard to such composition, it is preferred that the fourth compound has at least two hydroxy groups bonded to a phosphorus atom.

With regard to such composition, it is preferred that the fourth compound has a double bond between the phosphorus atom and an oxygen atom.

With regard to such composition, it is preferred that such composition further includes a fifth compound, which acts as an antioxidizing agent.

A method for manufacturing a component or device relating to an aspect hereof includes: providing a member; disposing any one of the above compositions on the member; and curing such composition.

A film relating to an aspect of the disclosure is characterized in that a rate of decrease of a thickness of the film is equal to or smaller than 11% when the film is exposed to air at 270 degrees Celsius for 5 minutes.

With regard to the film, it is preferable that the rate of decrease of a thickness of the film is equal to or smaller than 10% when the film is exposed to air at 270 degrees Celsius for 5 minutes.

With regard to the film, it is preferable that the rate of decrease of a thickness of the film is equal to or smaller than 9% when the film is exposed to air at 270 degrees Celsius for 5 minutes.

A film relating to an aspect of the present disclosure includes such film explained above. A device relating to an aspect of the disclosure includes the film explained above. It is preferred that the film is used as an interlayer insulating film.

With regard to such composition, it is preferable that such composition contains a monomer having three polymerizable groups. It is preferable that such monomer has a cyclic moiety such as alicyclic group and a molecular weight equal to or greater than 290.

It is preferred that the content of such monomer is 10-85 wt % in such composition. It is more preferable that the content is 15-65 wt %. If the content of such monomer in a composition is too high, the viscosity of such composition becomes high and it becomes difficult to fill grooves of mold with such composition. If the content of such monomer in a composition is too low, it is difficult to obtain enough hardness of a cured film formed by curing such composition due to low crosslink density and to suppress shrinkage of the volume of the cured film when the cured film is heat-treated.

With regard to such composition, it is preferred that such composition is a monomer having two polymerizable groups. It is preferable that such monomer has a cyclic moiety such as alicyclic group and a molecular weight equal to or greater than 290.

It is preferred that the content of such monomer having two polymerizable groups is 10-80 wt % in such composition because such range of the content of such monomer ensures compatibility between hardness and toughness of a cured film formed from such composition. It is more preferable that the content is 15-65 wt %.

With regard to such composition, it is preferable that such composition contains a silane coupling agent. It is preferable that such silane coupling agent has a polymerizable group. It is preferred that the content of such silane coupling agent in such composition is 0.2-40 wt %. It is more preferable that the content of such silane coupling agent is 1-20 wt %. Such polymerizable group is a group that is able to be polymerized by a radical. Typically, such polymerizable group is acryloyl or methacryloyl group.

The adhesiveness of a cured film formed by such composition containing such silane coupling agent to a substrate on which the cured film is formed becomes low if the content of such silane coupling agent is too low while the hardness of the cured film is reduced if the content of such silane coupling agent is too high. Such silane coupling agent preferably has at least one alkoxy group on the silicon atom contained in such silane coupling agent. It is more preferable that such silane coupling agent has two or more alkoxy groups because such silane coupling agent can make plural bonds with the surface of such substrate to improve the adhesiveness of the cured film to such substrate.

With regard to such composition, such composition may contain an initiator for curing such composition to form a cured film. Such initiator may generate radical, acid or base by irradiating or heating such initiator. It is preferable that the content of an initiator in such composition is 0.1-10 wt %. It is more preferable that the content of such initiator is 1-6 wt %. It is preferred that the molecular weight of such initiator is equal to or greater than 250. It is more preferable that the molecular weight of such initiator is equal to or greater than 300. The hardness of a cured film formed from such composition is reduced if the content of such initiator is too high while it is difficult to cure such composition to form a cured film if the content of such initiator is too low. If the molecular weight of such initiator is higher, the heat-resistance of such cured film to reduction of the volume of such cured film or change of pattern formed in such cured film becomes higher.

With regard to such composition, such composition may contain a phosphoric acid. Such phosphoric acid can enhance hydrolysis of the silane coupling agent to improve adhesiveness to a cured film formed from such composition. It is preferable that the content of such phosphoric acid in such composition is 0.1-5 wt %. It is more preferable that the content of such initiator is 0.1-1 wt %. It is preferred that such phosphoric acid has at least one polymerizable group.

Since such phosphoric acid can form a bond with another constituent contained in such composition, outflow of such phosphoric acid from such cured film is suppressed even by heating. It is preferred that such polymerizable group can be polymerized by a radical. A typical example of such polymerizable group able to be polymerized by a radical is an acryloyl or methacryloyl group. The adhesiveness of such cured film is reduced if the content of such phosphoric acid is too low while precipitation of such phosphoric acid occurs if the content of such phosphoric acid is too high.

With regard to such composition, such composition may contain antioxidizing agent. It is preferable that the content of such antioxidizing agent in such composition is 0.05-10 wt %. It is more preferable that the content of such antioxidizing agent is 0.1-5 wt %. Such antioxidizing agent can suppress volume shrinkage or thickness shrinkage in curing such composition to reduce deviation of pattern dimension of a cured film formed of such composition from the expected dimension. Furthermore, such antioxidizing agent can suppress reduction of the optical transmittance of such cured film even by heat-treating. Preferable examples of such antioxidizing agent are compounds having a phenolic moiety. The above effects are not obtained clearly if the content of such antioxidizing agent is too low while inhibition of curing such composition is observed if the content of such antioxidizing agent is too high.

Preferably, the molecular weight of such antioxidizing agent is equal to or greater than 600. More preferably, the molecular weight of such antioxidizing agent is equal to or greater than 1000. More preferable antioxidizing agents are represented in the following chemical formula:

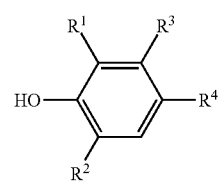

(1)

$R^1$ is hydrogen atom, methyl group or t-butyl group. $R^2$ is hydrogen atom, methyl group or t-butyl group. $R^3$ is hydrogen atom o methyl group. $R^4$ is alkyl group containing at least one carbon atom. Such alkyl group may contain sulfur atom, oxygen atom or nitrogen atom.

Preferably, $R^1$, $R^2$ and $R^3$ are hydrogen atom, t-butyl group and methyl group, respectively. Alternatively, $R^1$, $R^2$ and $R^3$ are methyl group, t-butyl group and hydrogen atom, respectively. More preferably, $R^1$, $R^2$ and $R^3$ are t-butyl group, t-butyl group and hydrogen atom, respectively.

BRIEF DESCRIPTION OF THE DRAWINGS

In the drawings, which illustrate what is currently considered to be the best mode for carrying out the invention.

DETAILED DESCRIPTION

Experimental Procedures

Figure 1:
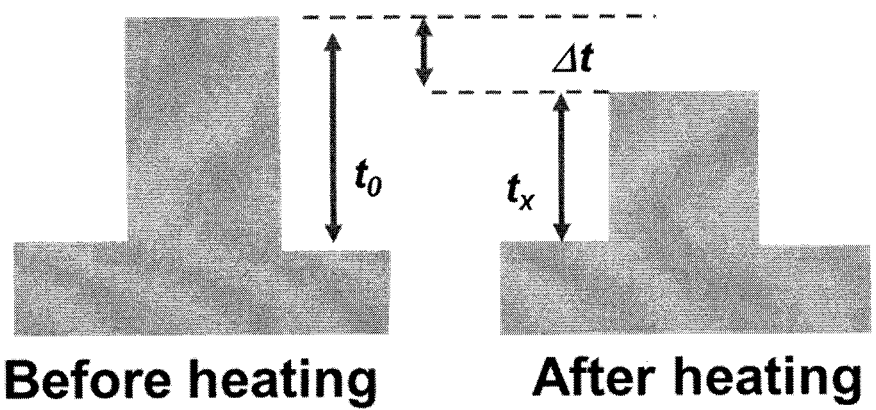
FIG. 1 shows a drawing showing a decreased rate of the changes in heights of protrusion of cured films with patterns.

Samples A-N are prepared for exploring compositions suitable for formation of resins or cured films with high heat resistance. Each of the samples for formation of resins or cured films contains at least six constituents among Constituents A-S. Constituents A-F, L and M are to be the major portion of resins or cured films formed from samples. Constituents G and I act as a silane coupling agent and a phosphoric acid improving adhesiveness to a substrate on which the resin or cured films formed, respectively. Constituent K is surface active agent. Constituents H, N, O, P and Q are antioxidizing agents. Constituents J, R and S are initiators for curing the samples.

Constituent A

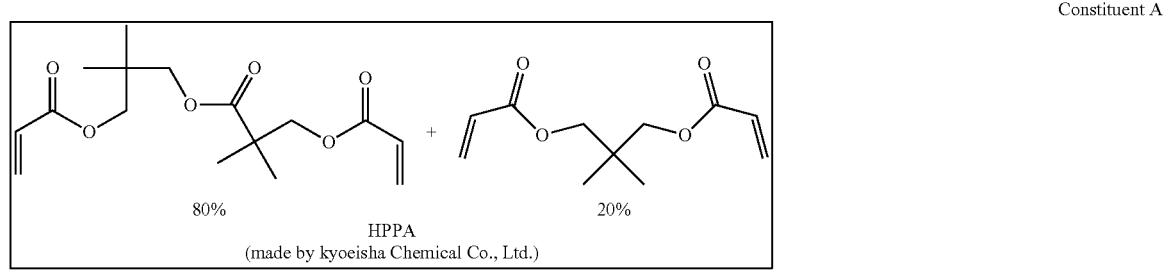

Constituent B

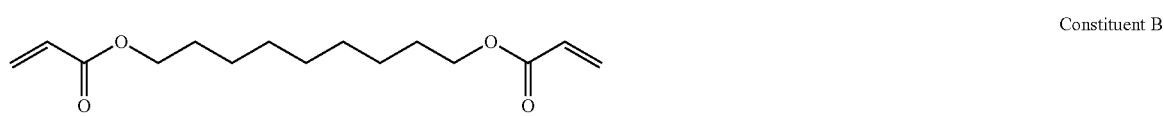

Constituent C

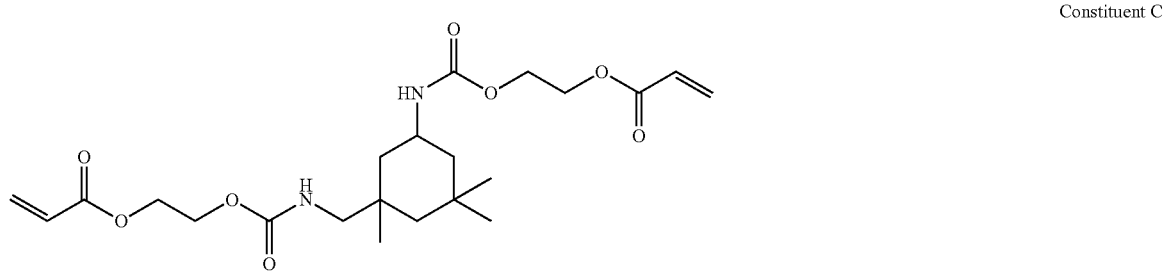

Constituent D

Constituent E

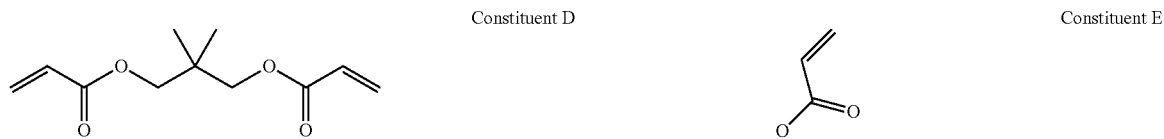

Constituent F

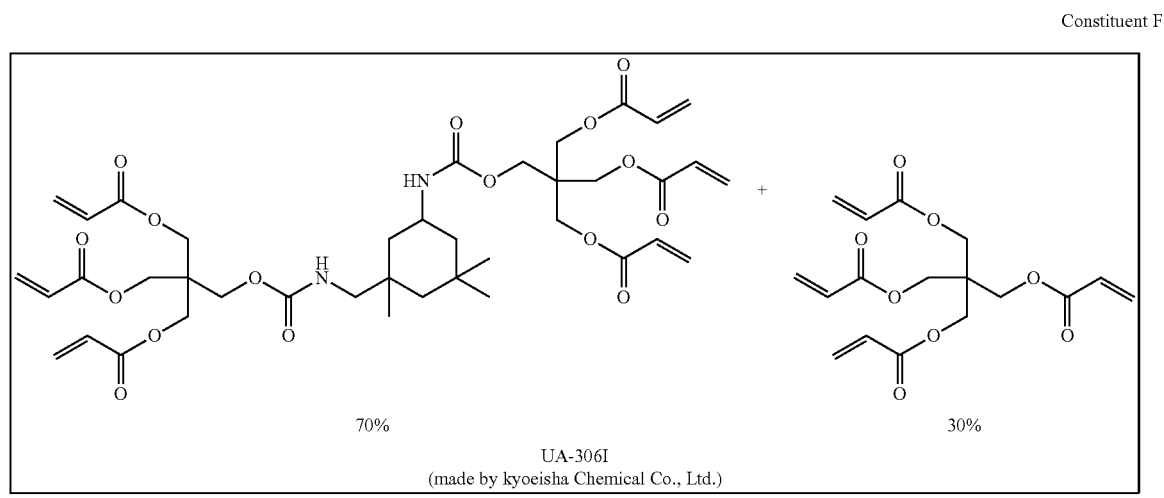

-continued
Constituent G
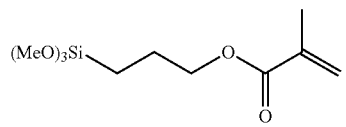
Constituent H
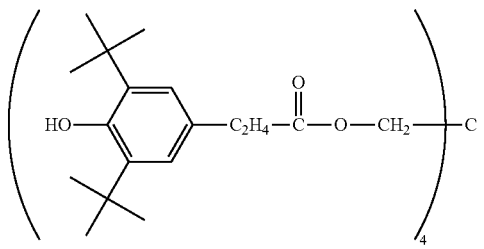
Constituent I
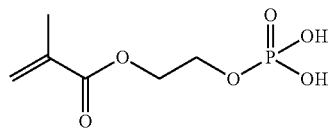
Constituent J
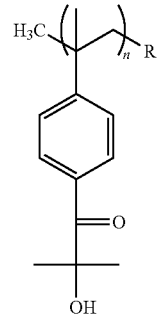
n = 2
Esacure One
(the photo initiator made by Lamberti S.p.A.)
Constituent K
Surface active agent
(DIC Corporation)
Constituent L
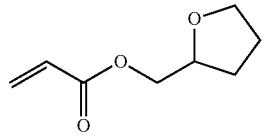
Constituent M
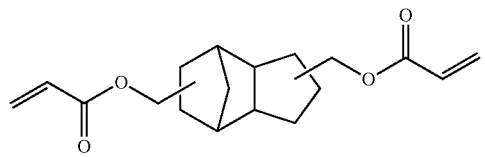
Constituent N
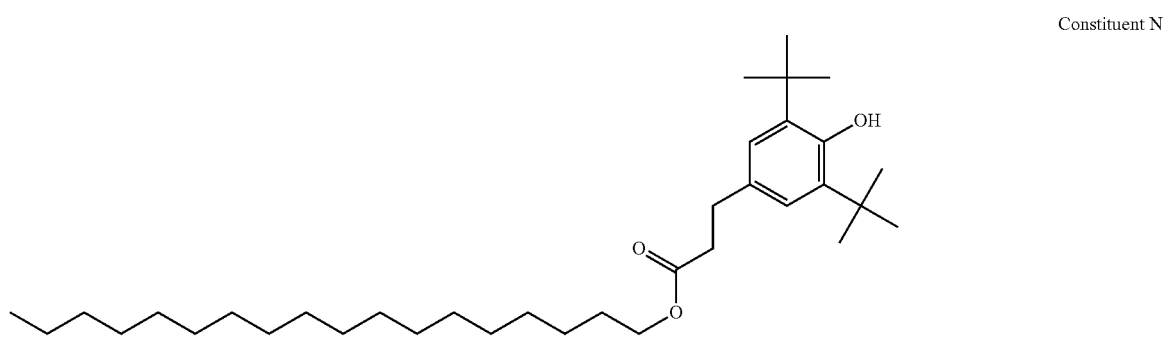

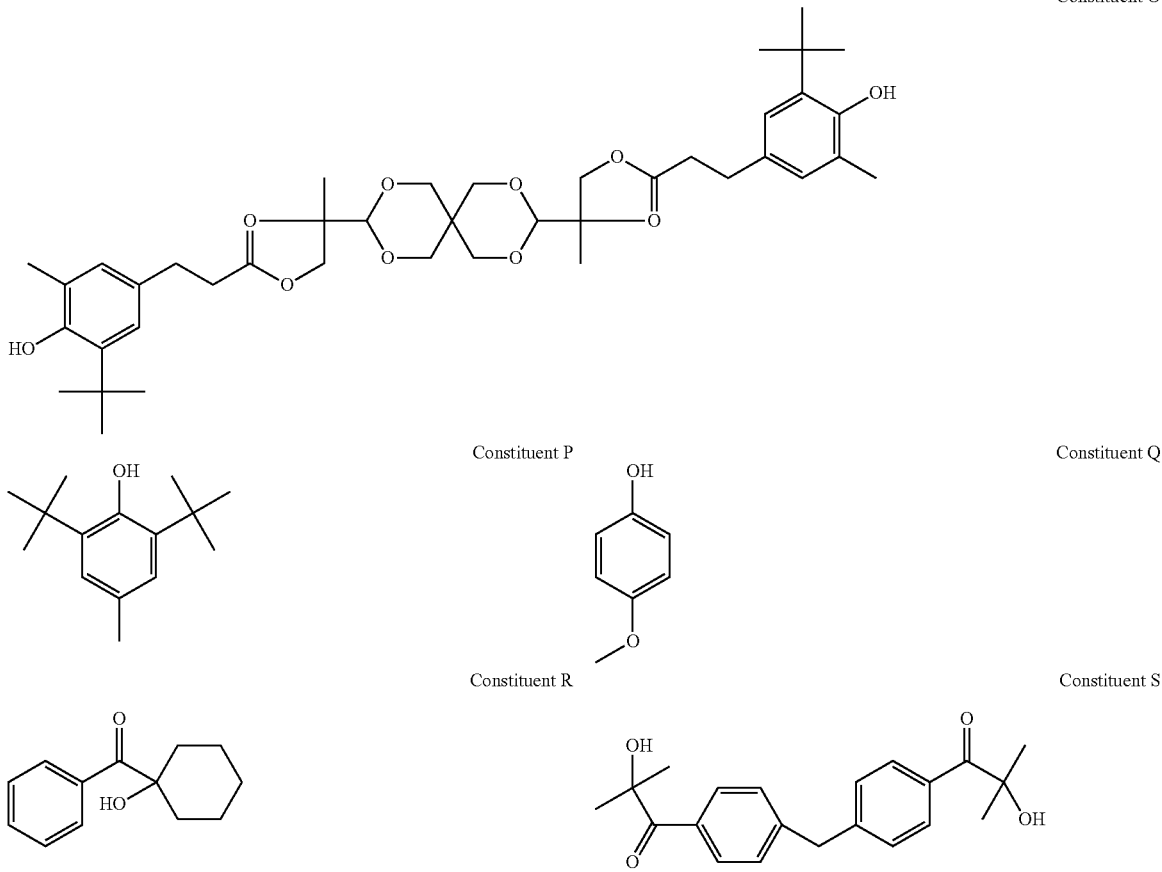

Constituent A contains compounds, each of which has only two polymerizable groups. Each of Constituents B, C and D is a compound which has only two polymerizable groups. Constituent C has a cyclic moiety. Constituent E has three polymerizable groups. The three polymerizable groups are connected to one carbon atom through respective methylene groups bonded to the one carbon atom. Constituent F contains a compound having six polymerizable groups and a compound having four polymerizable groups. Three polymerizable groups among the six polymerizable groups are connected to one carbon atom through respective methylene groups bonded to the one carbon atom while the four polymerizable groups are connected to one carbon atom through respective methylene groups bonded to the one carbon atom.

Constituent G is a silane coupling agent having a polymerizable group and three alkoxy groups. Constituent H is an antioxidizing agent that has a phenolic moiety and has a molecular weight of 1178. Constituent I is a phosphoric acid that has a polymerizable group, two hydroxy groups on a phosphorus atom and a double bond between the phosphorus atom and an oxygen atom.

Constituent J is an initiator that can generate a radical by absorbing a light and has a molecular weight greater than 300. Constituent K is a surface active agent. Constituent L is a compound having only one polymerizable group. Constituent M is a compound having two polymerizable groups. Constituents N, O, P and Q are antioxidizing agents that have respective phenolic moieties and molecular weights of 530.86, 740.96, 220.35 and 124.14, respectively. Each of Constituents R and S are initiators that can generate a radical by absorbing a light and have molecular weights of 204.26 and 340.41, respectively.

Evaluation of Substrate Adhesion Properties of Cured Films

The samples are applied on 0.7-mm-thick non-alkali glass substrates (EAGLE XG, Corning Incorporated) by a Wire Bar Coater No. 3 (Yasuda Seiki Seisakusho, Ltd.) so that thickness of coating films of the samples is approximately 5 µm. The coating films are heated at 90 degrees Celsius for 2 minutes. The coating films are cured to form cured films by exposing the coating films for 50 seconds to a light of which wavelength and illuminance is 365 nm and 20 mW/cm$^2$, respectively, from a UVLED source provided in an imprint system (ST-02, Toshiba Machine Co., Ltd.). According to JIS K-5400, gratings are made in 1 mm intervals in the cured films with a cutter to form 100 squares. The result of the cross-cut test is expressed as "g" if, after the 100 squares are attached firmly to the tape, none of the 100 squares is exfoliated from the non-alkali glass even by pulling the tape outward from the 100 squares, while the cross-cut test is expressed as "ng" if, after the 100 squares are attached firmly to the tape, all of the 100 squares are exfoliated from the non-alkali glass by pulling the tape outward from the 100 squares.

Transmittance Assessment of Cured Films

The samples are applied to 0.7-mm-thick non-alkali glass substrates (EAGLE XG, Corning Incorporated) by spin coating so that the thickness of the coating films of the samples are approximately 2 The coating films are heated at 90 degrees Celsius for 2 minutes. The coating films are cured to form cured films by exposing the films for 50 seconds to a light of which wavelength and illuminance is 365 nm and 20 mW/cm$^2$, respectively, from a UVLED source provided in an imprint system (ST-02, Toshiba Machine Co., Ltd.). The optical transmittance of the cured films is measured in a wavelength range from 400 nm to 800 nm by UVNis spectrophotometer (V-550, JASCO International Co., Ltd.). The averages of the optical transmittance are calculated with respect to each 0.5 nm in the wavelength range. Similarly, after heating the cured films at 270 degrees Celsius in the atmosphere for 5 minutes, measurement of the optical transmittance and the calculation of the optical transmittance are performed. Furthermore, the averages of the change of the optical transmittance between before and after heating are calculated on the basis of the above calculation results.

Thickness Reduction Evaluation of Cured Films

The samples are applied to 0.7-mm-thick non-alkali glass substrates (EAGLE XG, Corning Incorporated) by spin coating so that the thickness of the coating films of the samples are approximately 8-15 The coating films are heated at 90 degrees Celsius for 2 minutes. The coating films are cured to form cured films by exposing the coating films for 50 seconds to a light of which wavelength and illuminance is 365 nm and 20 mW/cm$^2$, respectively, from a UVLED source provided in an imprint system (ST-02, Toshiba Machine Co., Ltd.). The thickness of the cured films is measured before heating by surface roughness meter (Surfcom 920B, Tokyo Seimitsu Co., Ltd.). Similarly, the thickness of the cured films is measured after heating the cured films at 270 degrees Celsius in the atmosphere for 5 minutes. The amounts of the change in the thickness between before and after heating are calculated on the basis of the above measurements of the thickness.

Evaluation of the Hardness of the Cured Films

The samples are applied to 0.7-mm-thick non-alkali glass substrates (EAGLE XG, Corning Incorporated) by spin coating so that the thickness of the coating films of the samples are approximately 8-15 μm. The pencil hardness is measured according to JIS K-5600.

Pattern Formations Conditions

Coating films are formed by disposing the samples on 0.7-mm-thick non-alkali glass substrates (EAGLE XG, Corning Incorporated) and heated at 90 degrees Celsius for 2 minutes. A quartz mold is disposed on each of the coating films so that the grooves of the quartz mold (Toppan Printing Co., Ltd.) are filled with such sample. The depth of grooves and the distance between the grooves are 200 nm and 500 nm, respectively. After that, the coating films are cured to form molded products by exposing the coating films for 50 seconds to a light of which wavelength and illuminance is 365 nm and 20 mW/cm$^2$, respectively, from a UVLED source provided in an imprint system (ST-02, Toshiba Machine Co., Ltd.). The molded products are peeled off from the quartz mold. The height of the convex portions formed in the molded product corresponding to the grooves formed in the quartz mold is measured by a scanning probe microscopy (NANOPICS1000, Seiko Instruments Inc.).

Coating films are formed by disposing the samples on 0.7-mm-thick non-alkali glass substrates (EAGLE XG, Corning Incorporated) and heated at 90 degrees Celsius for 2 minutes. A quartz mold is disposed on each of the coating films so that the grooves of the quartz mold (NIM-PH3000, NTT Advanced Technology Corporation) are filled with such sample. The depth of grooves and the distance between the grooves are 3 μm and 5 μm, respectively. After that, the coating films are cured to form molded products by exposing the coating films for 50 seconds to a light of which wavelength and illuminance is 365 nm and 20 mW/cm$^2$, respectively, from a UVLED source provided in an imprint system (ST-02, Toshiba Machine Co., Ltd.). The molded products are peeled off from the quartz molds. The height of the convex portions formed in the molded product corresponding to the grooves formed in the quartz mold is measured by confocal laser microscopy (OLS3100, Olympus Corporation).

Heat-Resistant Test Conditions for Molded Products

Each of the molded products obtained by the above methods is heated in a reflow oven (STR-3000R C, Shinapex Co., Ltd.) while controlling the temperature inside the reflow oven as follows: the temperature inside the oven is initially set at room temperature and elevated to 260 degrees Celsius from room temperature for 5 minutes; and, after that, the temperature inside the oven is maintained at 260 degrees Celsius and lowered to room temperature for 30 minutes. The height of the convex portions formed in the molded product heat-treated in the aforementioned manner is measured. Furthermore, the decrease rate of the heights is calculated based on the following equation:

$$\text{Decrease rate} = (t_0 - t_x)/t_0 \times 100 \quad (1)$$

In the equation, $t_0$ and $t_x$ are used for the height before heating and after heating, respectively, as shown in FIG. 1.

Table 1 shows constituents of Samples A-G for formation of cured films, heat resistance and pencil hardness of the cured films formed from the samples. The heat resistance and the pencil hardness are measured or estimated in the aforementioned manner.

TABLE 1

Constituents of samples for formation of cured films, heat resistance and pencil hardness of the cured films

| Constituents | Molecular weight | Sample A | Sample B | Sample C | Sample D | Sample E | Sample F | Sample G |
|---|---|---|---|---|---|---|---|---|
| Constituent A | 312.36 and 212.24 | 49.4% | — | — | — | — | — | — |
| Constituent B | 268.35 | — | — | 25.7% | — | — | — | — |
| Constituent C | 454.51 | 35.5% | — | 44.5% | 14.8% | — | — | — |
| Constituent D | 212.24 | — | 24.7% | — | — | — | — | — |
| Constituent E | 296.32 | — | — | 14.8% | 70.2% | 14.8% | 14.8% | 14.8% |
| Constituent F | 818.86 and 352.34 | — | 60.3% | — | — | — | — | — |
| Constituent G | 248.35 | 9.9% | 9.9% | 9.9% | 9.9% | 9.9% | 9.9% | 9.9% |
| Constituent H | 1178 | 1% | 1% | 1% | 1% | — | 1% | 1% |
| Constituent I | 210.12 | 0.2% | 0.2% | 0.2% | 0.2% | 0.2% | 0.2% | 0.2% |
| Constituent J | >300 | 3.9% | 3.9% | 3.9% | 3.9% | — | — | — |
| Constituent K | — | 0.1% | — | — | — | — | — | — |
| Constituent L | 156.18 | — | — | — | — | 49.4% | 49.4% | 49.4% |
| Constituent M | 304.38 | — | — | — | — | 20.7% | 20.7% | 20.7% |
| Constituent N | 530.86 | — | — | — | — | — | — | — |

TABLE 1-continued

Constituents of samples for formation of cured films, heat resistance and pencil hardness of the cured films

| Constituents | Molecular weight | Sample A | Sample B | Sample C | Sample D | Sample E | Sample F | Sample G |
|---|---|---|---|---|---|---|---|---|
| Constituent O | 740.96 | — | — | — | — | — | — | — |
| Constituent P | 220.35 | — | — | — | — | — | — | — |
| Constituent Q | 124.14 | — | — | — | — | — | — | — |
| Constituent R | 204.26 | — | — | — | — | 3.9% | 3.9% | — |
| Constituent S | 340.41 | — | — | — | — | — | — | 3.9% |
| Cross cut adhesion test | | g | g | g | g | g | g | g |
| Pencil hardness test | | H | 4 H | H | 4 H | H | H | H |
| Heat resistance tests (270 degrees Celsius for 5 min) Film thickness before heating | | 13.54 μm | 13.77 μm | 14.50 μm | 9.82 μm | 11.90 μm | 9.87 μm | 15.40 μm |
| Film thickness after heating | | 11.29 μm | 12.52 μm | 12.80 μm | 8.86 μm | 10.13 μm | 8.50 μm | 13.79 μm |
| Decrease rate in film thickness | | 17% | 9% | 11% | 10% | 15% | 14% | 11% |
| Transmittance before heating | | 92.08% | 91.87% | 91.95% | 91.88% | 91.84% | 91.84% | 90.11% |
| Transmittance after heating | | 92.14% | 91.92% | 91.97% | 91.98% | 90.61% | 91.33% | 91.23% |
| Heat resistance tests (260 degrees Celsius for 5 min) Decrease rate in d 3 μm | | 10% | 5% | 6% | 5% | 15% | 7% | 3% |
| Decrease rate in d 200 nm | | 8% | 6% | 8% | 8% | 12% | 7% | 4% |

Table 2 shows constituents of Samples H-N for formation of cured films, heat resistance and pencil hardness of the cured films formed from the samples. The heat resistance and the pencil hardness are measured or estimated in the aforementioned manner.

TABLE 2

Constituents of samples for formation of cured films, heat resistance and pencil hardness of the cured films

| Constituents | Molecular weight | Sample H | Sample I | Sample J | Sample K | Sample L | Sample M | Sample N |
|---|---|---|---|---|---|---|---|---|
| Constituent A | 312.36 and 212.24 | — | — | — | — | — | — | 49.4% |
| Constituent B | 268.35 | — | — | — | — | — | — | — |
| Constituent C | 454.51 | — | — | — | — | — | — | 35.5% |
| Constituent D | 212.24 | — | — | — | — | — | — | — |
| Constituent E | 296.32 | 14.8% | 14.8% | 14.8% | 14.8% | 14.8% | 14.8% | — |
| Constituent F | 818.86 and 352.34 | — | — | — | — | — | — | — |
| Constituent G | 248.35 | 9.9% | 9.9% | 9.9% | 9.9% | 9.9% | 9.9% | 9.9% |
| Constituent H | 1178 | — | 1% | — | — | — | — | 1% |
| Constituent I | 210.12 | 0.2% | 0.2% | 0.2% | 0.2% | 0.2% | 0.2% | — |
| Constituent J | >300 | 3.9% | 3.9% | 3.9% | 3.9% | 3.9% | 3.9% | 3.9% |
| Constituent K | - | — | — | — | — | — | — | 0.1% |
| Constituent L | 156.18 | 49.4% | 49.4% | 49.4% | 49.4% | 49.4% | 49.4% | — |
| Constituent M | 304.38 | 20.7% | 20.7% | 20.7% | 20.7% | 20.7% | 20.7% | — |
| Constituent N | 530.86 | — | — | — | 1% | — | — | — |
| Constituent O | 740.96 | — | — | 1% | — | — | — | — |
| Constituent P | 220.35 | — | — | — | — | 1% | — | — |
| Constituent Q | 124.14 | — | — | — | — | — | 1% | — |
| Constituent R | 204.26 | — | — | — | — | — | — | — |
| Constituent S | 340.41 | — | — | — | — | — | — | — |
| Cross cut adhesion test | | g | g | g | g | g | g | ng |
| Pencil hardness test | | H | H | H | H | H | H | — |
| Heat resistance tests (270 degrees Celsius for 5 min) Film thickness before heating | | 8.88 μm | 9.26 μm | 9.43 μm | 9.52 μm | 10.20 μm | 8.55 μm | — |
| Film thickness after heating | | 7.11 μm | 8.39 μm | 8.36 μm | 7.34 μm | 8.09 μm | 6.79 μm | — |
| Decrease rate in film thickness | | 20% | 9% | 11% | 23% | 21% | 21% | — |
| Transmittance before heating | | 91.58% | 91.78% | 91.69% | 91.78% | 91.79% | 91.62% | — |
| Transmittance after heating | | 90.48% | 91.85% | 91.69% | 90.62% | 90.59% | 90.48% | — |
| Heat resistance tests (260 degrees Celsius for 5 min) Decrease rate in d 3 μm | | 15% | 5% | 8% | 15% | 14% | 14% | — |
| Decrease rate in d 200 nm | | 18% | 4% | 8% | 18% | 18% | 18% | — |

Sample A contains Constituents A and C. Constituent A is a mixture of two compounds having two acryloyl groups as polymerizable groups. Constituent C has an alicyclic moiety and two acryloyl groups connected through respective two urethane groups and two methylene groups to the alicyclic moiety. Sample A does not contain any compound having three or more polymerizable groups.

The composition of Sample A is the same as that of Sample N except that Sample A contains Constituent I, which is the phosphoric acid mentioned above. Sample A can form a cured film on the substrate while a cured film is not formed from Sample N on the substrate. This indicates that a phosphoric acid such as Constituent I is important for formation of cured film on a substrate on a certain condition.

Sample B contains Constituent D, which is a compound having two polymerizable groups, and Constituent F, which is a mixture of two compounds having six polymerizable groups and four polymerizable groups, respectively. Sample B further contains Constituent H, which can act as an antioxidizing agent and has a molecular weight greater than 1000.

A cured film formed from Sample B reveals higher heat resistance. The decrease rate between before and after the heating treatment in film thickness of the cured film is 9%, while no decrease of optical transmittance of the cured film between before and after the heat treatment is observed. The cured film remains transparent even by heating.

In addition, the cured film of Sample B shows higher heat resistance to patterned features. The decrease rates for convex portions with heights of 3 µm and 200 nm are 5% and 6%, respectively, and both equal to or smaller than 6%.

Sample C contains Constituents B, C and Constituent E. Constituent B has two acryloyl groups as polymerizable groups. The two acryloyl groups are connected mutually through a plurality of methylene groups. Constituent C has an alicyclic moiety and two acryloyl groups connected through, respectively, two urethane groups and two methylene groups to the alicyclic moiety. Constituent E has three acryloyl groups as polymerizable groups. The three acryloyl groups are connected through three respective methylene groups to one carbon atom.

A cured film formed from Sample C reveals higher heat resistance. The decrease rate between before and after the heating treatment in film thickness of the cured film is 11%, while no decrease of optical transmittance of the cured film between before and after the heat treatment is observed. The cured film remains transparent even by heating.

In addition, the cured film of Sample C shows higher heat resistance to patterned features. The decrease rates for convex portions with heights of 3 µm and 200 nm are 6% and 8%, respectively, and both equal to or smaller than 8%.

Sample D contains Constituents C and E. The content of such monomer having three polymerizable groups like Constituent E is greater than 60 wt %.

A cured film formed from Sample D reveals higher heat resistance. The decrease rate between before and after the heating treatment in film thickness of the cured film is 10%, while no decrease of optical transmittance of the cured film between before and after the heat treatment is observed. The cured film remains transparent even by heating.

The cured film of Sample D shows higher heat resistance to patterned features. The decrease rates for convex portions with heights of 3 µm and 200 nm are 5% and 8%, respectively, and both equal to or smaller than 8%.

The pencil hardness of the cured films formed from Samples B and H is both 4 H, which is greater than cured film formed from the rest of the samples. It is preferable that the content of the monomer having three or more polymerizable groups is equal to or greater than 50 wt % to enhance the hardness of cured film. It is preferred that the content of such monomer having three or more polymerizable groups is equal to or greater than 60% to enhance the hardness of cured film or resin. It is more preferable that the content of such monomer is equal to or greater than 70% to the hardness of cured film or resin.

The composition of Sample E is the same as that of Sample F except that Sample F contains Constituent H, which can act as an antioxidizing agent. The cured film formed from Sample F reveals higher heat resistance, both to the thickness shrinkage and the decrease of the optical transmittance compared to Sample E. In addition, the cured film of Sample F shows higher heat resistance to patterned features. The decrease rates for convex portions with heights of 3 µm and 200 nm are 7% and 7%, respectively, and both equal to or smaller than 7%.

This indicates that an antioxidizing agent contributes to improvement of heat resistance, both to the thickness shrinkage and the decrease of the optical transmittance.

The composition of Sample G is the same as that of Sample F, except that Sample G contains Constituent S instead of Constituent R contained in Sample F. Although both Constituents R and S can act as initiators, Constituent S has a molecular weight greater than that of Constituent R. The cured film formed from Sample G reveals higher heat resistance, both to the thickness shrinkage and the decrease of the optical transmittance compared to Sample F.

The cured film of Sample G shows higher heat resistance to patterned features. The decrease rates for convex portions with heights of 3 µm and 200 nm are 3% and 4%, respectively, and both equal to or smaller than 4%.

This indicates that an initiator having greater molecular weight contributes to improvement of heat resistance, both to the thickness shrinkage and the decrease of the optical transmittance. It is preferred that the initiator has a molecular weight greater than 300.

The composition of Sample H is the same as that of Sample I except that Sample I contains Constituent H, which can act as an antioxidizing agent. The cured film formed from Sample I reveals higher heat resistance, both to the thickness shrinkage and the decrease of the optical transmittance compared to Sample H.

The cured film of Sample I shows higher heat resistance to patterned features. The decrease rates for convex portions with heights of 3 µm and 200 nm are 5% and 4%, respectively, and both equal to or smaller than 5%.

This indicates that an antioxidizing agent contributes to improvement of heat resistance, both to the thickness shrinkage and the decrease of the optical transmittance.

The composition of Sample K is the same as that of Samples I and J except that Samples I and J contain Constituents H and O, respectively, instead of Constituent N contained in Sample K. Although Constituent N can act as an antioxidizing agent similar to Constituents H and O, Constituent N has a molecular weight smaller than those of Constituents H and O. The cured film formed from Samples I and J reveal higher heat resistance, both to the thickness shrinkage and the decrease of the optical transmittance compared to Sample K.

In this connection, the cured film of Sample J shows higher heat resistance to patterned features. The decrease rates for convex portions with heights of 3 µm and 200 nm are 8% and 8%, respectively, and both equal to or smaller than 10%.

This indicates that an antioxidizing agent having greater molecular weight contributes to improvement of heat resistance, both to the thickness shrinkage and the decrease of the optical transmittance. It is preferred that an antioxidizing agent has a molecular weight equal to or greater than 600. It is more preferable that the molecular weight of an antioxidizing agent is equal to or greater than 1000.

The composition of Sample L is the same as that of Samples I and J except that Samples I and J contain Constituents H and O, respectively, instead of Constituent P contained in Sample L. Although Constituent P can act as an antioxidizing agent similar to Constituents H and O, Constituent P has a molecular weight smaller than those of Constituents H and O. The cured film formed from Samples I and J reveal higher heat resistance, both to the thickness shrinkage and the decrease of the optical transmittance compared to Sample L. This indicates that an antioxidizing agent having greater molecular weight contributes to improvement of heat resistance, both to the thickness shrinkage and the decrease of the optical transmittance. It is preferred that an antioxidizing agent has a molecular weight equal to or greater than 600. It is more preferable that the molecular weight of an antioxidizing agent is equal to or greater than 1000.

The composition of Sample M is the same as that of Samples I and J except that Samples I and J contain Constituents H and O, respectively, instead of Constituent Q contained in Sample M. Although Constituent Q can act as an antioxidizing agent similar to Constituents H and O, Constituent Q has a molecular weight smaller than those of Constituents H and O. The cured film formed from Samples I and J reveal higher heat resistance, both to the thickness shrinkage and the decrease of the optical transmittance compared to Sample M. This indicates that an antioxidizing agent having greater molecular weight contributes to improvement of heat resistance, both to the thickness shrinkage and the decrease of the optical transmittance. It is preferred that an antioxidizing agent has a molecular weight equal to or greater than 600. It is more preferable that the molecular weight of an antioxidizing agent is equal to or greater than 1000.

Samples B-D, F, G, I and J are preferable for starting materials for formation components or devices because the application of heat is usually carried out in the fabrication process of components or devices. Typical examples of components are optical components such as lens, antireflection film and light guide, while typical examples of devices are electronic devices such as semiconductor devices and electro-optical devices such as display devices, e.g., liquid crystal devices and electroluminescent devices and electrophoretic devices. Usage of resins formed from any one of the Samples enables a device to suppress disconnection or deterioration of the device.

FIGS. 2A through 2F show fabrication processes for active matrix-type organic electroluminescent devices, which is an example of a device or component.

Figure 2A:
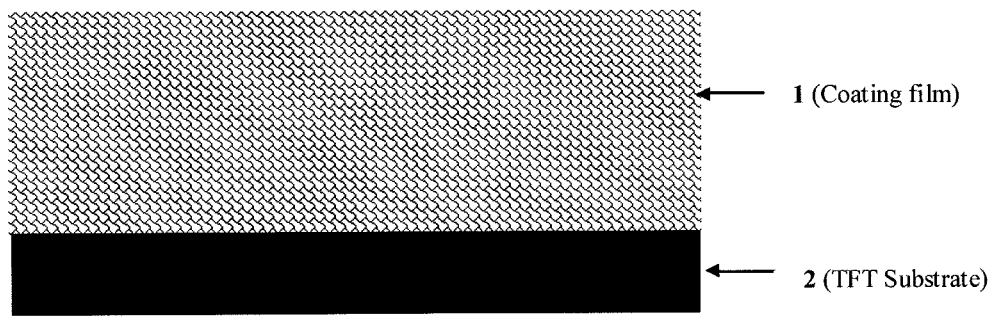
FIGS. 2A through 2F show the processes for manufacturing an organic electroluminescent device.

FIG. 2A: Coating film 1 is formed on TFT substrate 2 by application of a solution of any one of Samples B-D, F, G, I and J to the upper surface of TFT substrate 2.

Figure 2B:
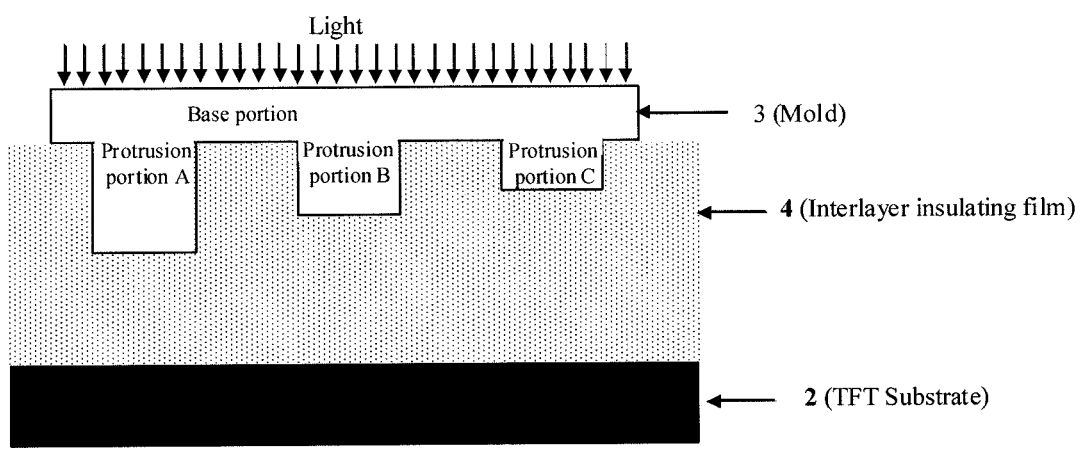

FIG. 2B: Mold 3 having a base portion and protrusion portions A, B and C, which protrude from the base portion. Coating film 1 is converted into interlayer insulating film 4 by a light irradiation through mold 3. In interlayer insulating film 4, recesses of which depths vary corresponding to protrusion portions A, B and C of mold 3 are formed after removal of mold 3 following the light irradiation.

Figure 2C:
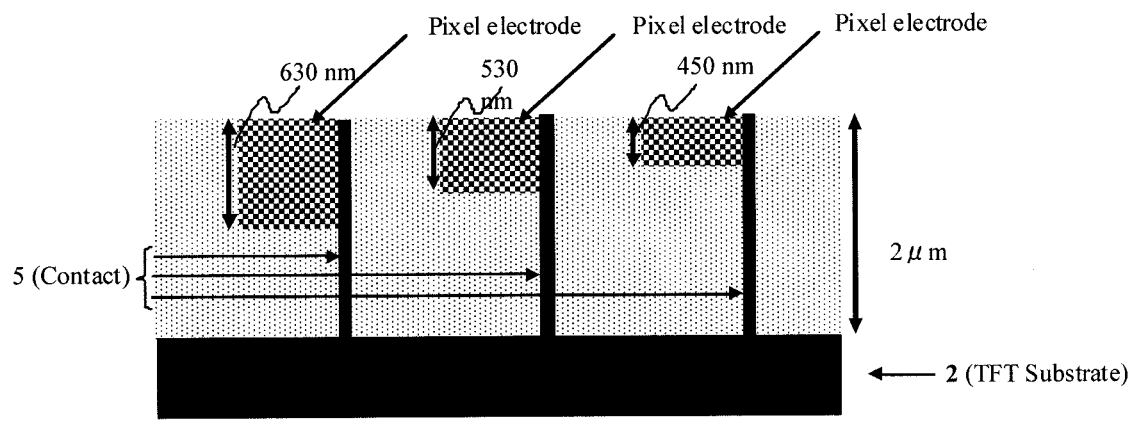

FIG. 2C: Pixel electrodes are formed in the recesses formed in interlayer insulating film 4. Typically, the pixel electrodes are formed of indium-tin-oxide (ITO). Thickness of pixel electrodes varies according to colors of lights emitted by pixels.

Typically, the thickness of pixel electrode for pixel R, which is to be formed in the process (FIG. 2E), is about 630 nm, which is approximately comparable to the wavelength of a red light. The thickness of pixel electrode for pixel G, which is to be formed in the process (FIG. 2E), is about 530 nm, which is approximately comparable to the wavelength of a green light. The thickness of pixel electrode for pixel B, which is to be formed in the process (FIG. 2E), is about 450 nm, which is approximately comparable to the wavelength of a blue light.

Contact 5 through which the pixel electrodes are electrically connected to TFTs of TFT substrate. It is preferable that planarization of the upper surfaces of pixel electrodes, interlayer insulating film 4 and contact 5 is carried out such that the upper surfaces become coplanar.

Figure 2D:
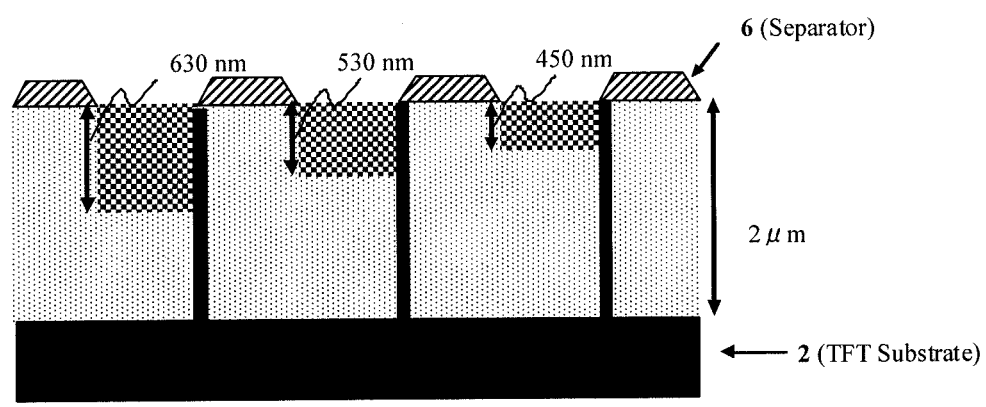

FIG. 2D: Separator 6, which divides one pixel from an adjacent pixel, is formed on interlayer insulating film 4 by photolithography or nano-imprinting technology.

Figure 2E:
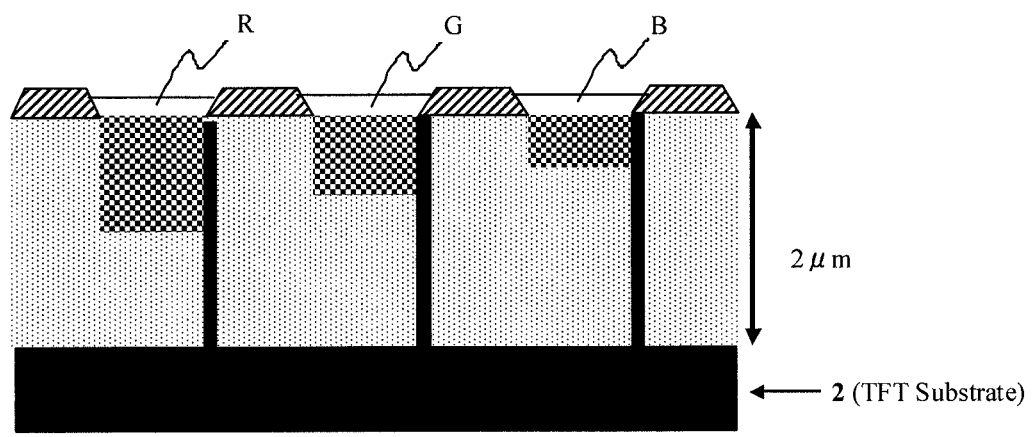

FIG. 2E: Pixels R, G and B are formed on pixel electrodes. Each of the pixels includes a light-emitting layer, a hole injection layer, a hole transport layer, an electron injection layer and an electron transport layer.

Figure 2F:
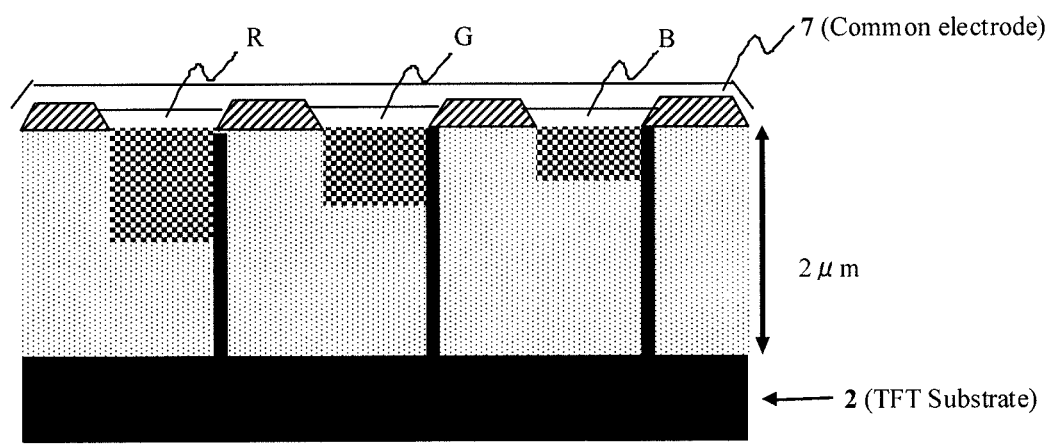

FIG. 2F: Common electrode 7 is formed such that common electrode 7 covers pixels. Typically, common electrode 7 is formed of magnesium-silver alloy.

The hole injection layer is disposed between the hole transport layer and the corresponding pixel electrode. The light-emitting layer is disposed between the hole transport layer and the electron transport layer. The electron injection layer is disposed between the electron transport layer and common electrode 7.

Lights that are emitted by the light-emitting layers toward the bottoms of pixel electrodes are reflected by boundaries between interlayer insulating layer 4 and pixel electrodes and formation of resonance of the emitted lights occur. Such resonance can improve purity of wavelengths, the directionality or the intensity of the emitted lights.

Volume shrinkage or decrease of the thickness of interlayer insulating layer 4 induces changes of sizes of cavities for such resonance to impair the resonance condition. In a more severe case, lights outputting from the device may change due to volume shrinkage or decrease of the thickness. Resin of which volume shrinkage or decrease of the thickness are small is desirable for formation of interlayer insulating layer 4.

As shown in Tables 1 and 2, resins formed from Samples B-D, F, G, I and J show small decrease of the film thickness, i.e., 11% or less even by the application of heat. It is preferable that interlayer insulating layer 4 is formed from any one of Samples B-D, F, G, I and J. It is more preferable that interlayer insulating layer 4 is formed from Sample D because the resin formed from the sample has more excellent heat resistance, i.e., the rate of decrease in the film thickness (10%).

Among the samples, it is most preferable that interlayer insulating layer 4 is formed from Samples B and I because the resins formed from the samples have most excellent heat resistance, i.e., the rate of decrease in the film thickness (9%) among Samples B-D, F, G, I and J.

What is claimed is:

1. A method for manufacturing a component, the method comprising:
    providing a member;
    disposing a composition on the member to form a coating film; and
    curing the coating film;
    wherein the composition includes:
    a first monomer having three or more polymerizable groups;
    a second monomer having two polymerizable groups;
    an initiator able to generate a radical by cleavage of a bond of the initiator;
    a silane coupling having a polymerizable group; and
    a phosphoric acid compound having at least one hydroxy group bonded to a phosphorus atom that enhances adhesiveness of the composition to the member,
    wherein the content of the first monomer is 10-85 wt %, and
    wherein the content of the second monomer is 10-80 wt %.

2. The method according to claim 1, wherein the first monomer has no aromatic group.

3. The method according to claim 1, wherein each of the three or more polymerizable groups of the first monomer is any one of an acryloyl group and a methacryloyl group.

4. The method according to claim 1, wherein the first monomer has more than three polymerizable groups.

5. The method according to claim 1, wherein each of the two polymerizable groups of the second monomer is an identical substituent.

6. The method according to claim 1, wherein the content of the first monomer is within the range of 10 to 85 wt % of the composition;
the content of the initiator is within the range of 0.1 to 10 wt % of the composition;
the content of the silane coupling is within the range of 0.2 to 40 wt % of the composition; and
the content of the phosphoric acid compound is within the range of 0.1 to 5 wt % of the composition.

7. The method according to claim 6, wherein the content of the first monomer is greater than or equal to 50 wt % of the composition.

8. The method according to claim 1, wherein the first monomer has a molecular weight greater than or equal to 290.

9. The method according to claim 1, wherein the composition further comprises an antioxidizing agent.

10. A method for manufacturing a component, the method comprising:
providing a member;
disposing a composition on the member to form a coating film; and
curing the coating film;
wherein the composition includes:
a first monomer having three or more polymerizable groups;
a second monomer having two polymerizable groups;
an initiator able to generate a radical by cleavage of a bond of the initiator;
a silane coupling having a polymerizable group;
an antioxidizing agent; and
a phosphoric acid compound having at least one hydroxy group bonded to a phosphorus atom that enhances adhesiveness of the composition to the member,
wherein the antioxidizing agent is a compound represented by the following formula (1):

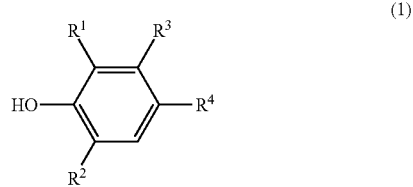

(1)

wherein, $R^1$ is selected from the group consisting of hydrogen atom, methyl group, and t-butyl group;
wherein, $R^2$ is selected from the group consisting of hydrogen atom, methyl group, and t-butyl group;
wherein, $R^3$ is selected from the group consisting of hydrogen atom, and methyl group; and
wherein $R^4$ is selected from the group consisting of alkyl group containing at least one carbon atom; and the alkyl group of $R^4$ optionally contains sulfur atom, oxygen atom or nitrogen atom.

11. The method according to claim 9, wherein a content of the antioxidizing agent is within the range of 0.05 to 10 wt % of the composition.

12. The method according to claim 1, wherein the component is an optical component or an optical device.

13. The method according to claim 1, further comprising:
disposing a mold having a groove on the coating film so that the groove is filled with the composition before the curing by imprinting.

14. A method for manufacturing a component, the method comprising:
providing a member;
disposing a composition on the member to form a coating film; and
curing the coating film;
wherein the composition includes:
a first monomer having three or more polymerizable groups;
an initiator able to generate a radical by cleavage of a bond of the initiator;
a silane coupling having a polymerizable group;
a phosphoric acid compound having at least one hydroxy group bonded to a phosphorus atom that enhances adhesiveness of the composition to the member; and
an antioxidizing agent represented by the following formula (1):

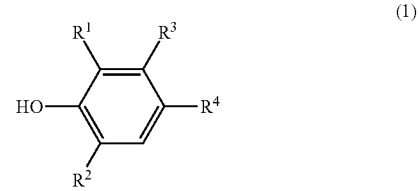

(1)

wherein, $R^1$ is selected from the group consisting of hydrogen atom, methyl group, and t-butyl group;
wherein, $R^2$ is selected from the group consisting of hydrogen atom, methyl group, and t-butyl group;
wherein, $R^3$ is selected from the group consisting of hydrogen atom, and methyl group; and
wherein $R^4$ is selected from the group consisting of alkyl group containing at least one carbon atom; and the alkyl group of $R^4$ optionally contains sulfur atom, oxygen atom or nitrogen atom.

15. The method according to claim 14, wherein the content of the antioxidizing agent is within the range of 0.05 to 10 wt % of the composition.

16. A method for manufacturing a component, the method comprising:
disposing a composition on a member to form a coating film;
disposing a mold having a groove on the coating film so that the groove is filled with the composition before the curing by imprinting; and
curing the coating film;
wherein the composition includes:
a first monomer having three or more polymerizable groups;
a second monomer having two polymerizable groups;
an initiator able to generate a radical by cleavage of a bond of the initiator;
a silane coupling having a polymerizable group; and
a phosphoric acid compound having at least one hydroxy group bonded to a phosphorus atom that enhances adhesiveness of the composition to the member,
wherein the content of the first monomer is 10-85 wt %, and
wherein the content of a second monomer is 10-80 wt %.

* * * * *